(No Model.) 2 Sheets—Sheet 1.
J. F. WHITAKER.
VELOCIPEDE.
No. 489,645. Patented Jan. 10, 1893.
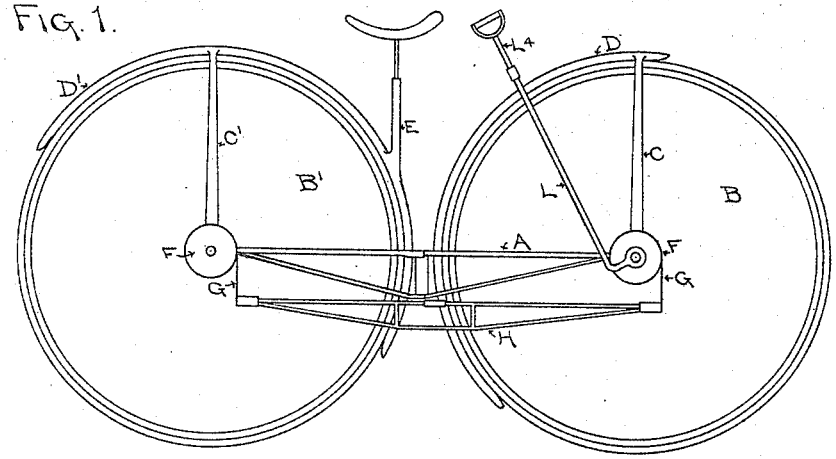
Fig. 1.
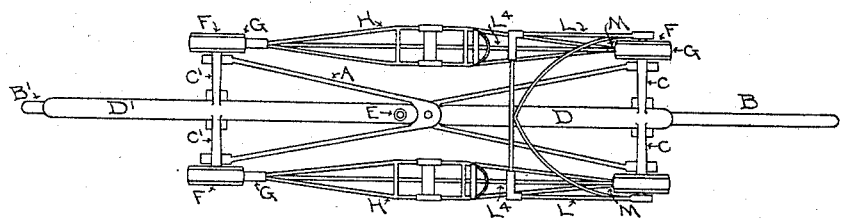
Fig. 2.
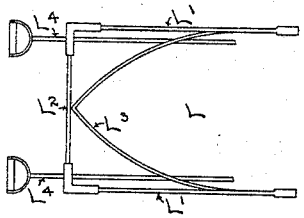
Fig. 3.
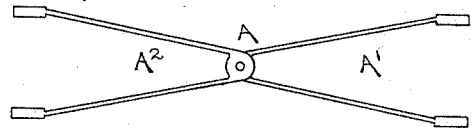
Fig. 4.
Fig. 5.
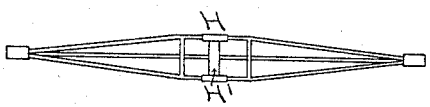
WITNESSES:
Joseph Dawson.
Charles A. Safford.
INVENTOR,
Joseph F. Whitaker.

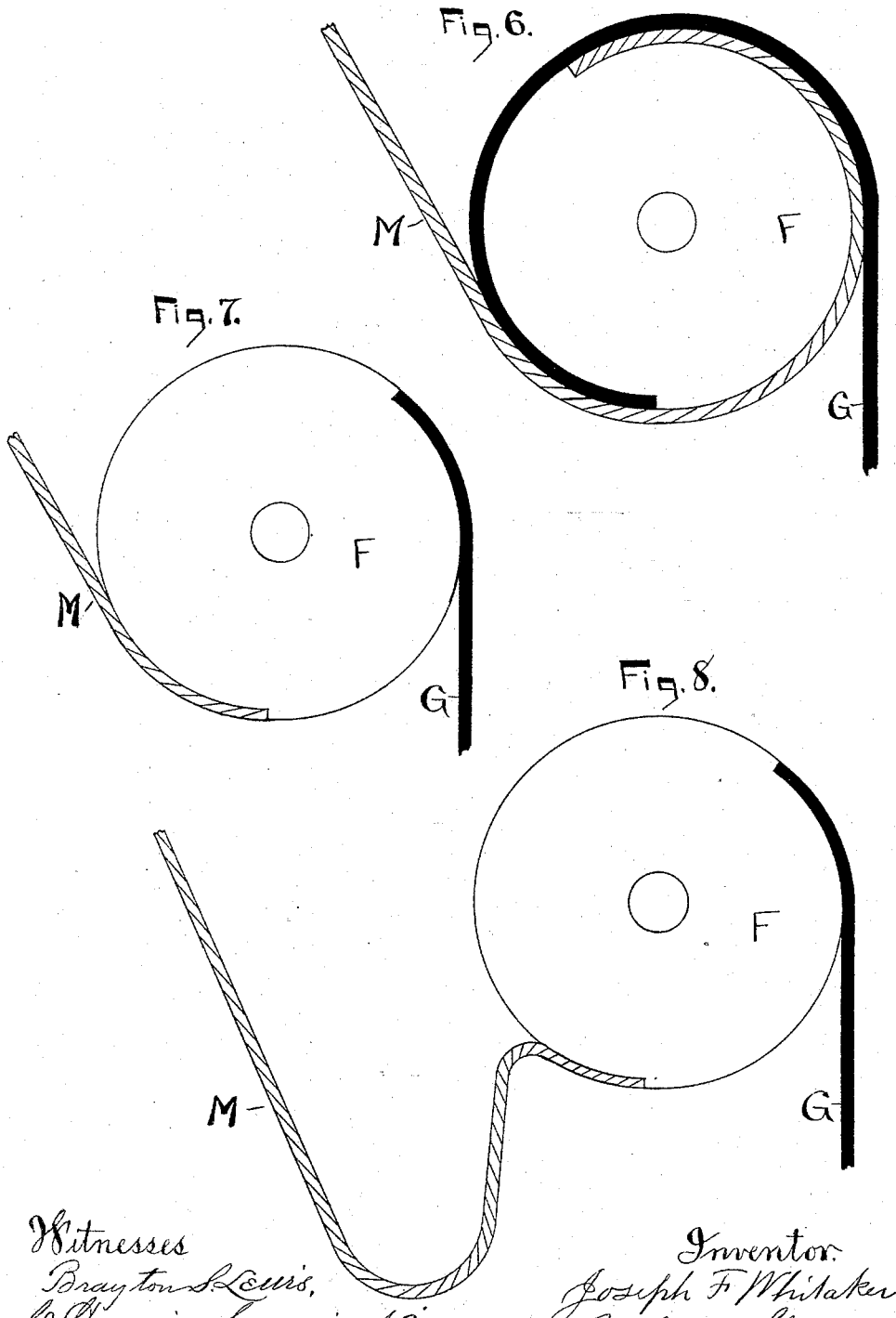

UNITED STATES PATENT OFFICE.

JOSEPH F. WHITAKER, OF HARTFORD, CONNECTICUT.

VELOCIPEDE.

SPECIFICATION forming part of Letters Patent No. 489,645, dated January 10, 1893.

Application filed July 21, 1891. Serial No. 400,259. (No model.)

*To all whom it may concern:*

Be it known that I, JOSEPH F. WHITAKER, a citizen of the United States, residing at Hartford, in the county of Hartford and State of Connecticut, have invented certain new and useful Improvements in Vehicles, of which the following is a specification.

My invention relates to that class of vehicles which are propelled by the rider or riders, and the object of my improvements is efficiency in operation in general, and especially in reference to the propelling devices.

In the accompanying drawings—Figure 1 is a side view of my vehicle. Fig. 2 is a plan view of the same. Fig. 3 is a plan view of the steering frame and handles, the latter serving also as a part of the propelling devices. Fig. 4 is a plan view of the main frame. Fig. 5 is a plan view of one of the pedal bars. Fig. 6 is an enlarged detached side view of the spring coil drum and its straps as wound thereon. Fig. 7 is a like view of the same with both straps taut and nearly unwound from the drum, and Fig. 8 is a like view of the same with both straps nearly unwound from the drum, while one strap is taut and the other is slack.

A designates the frame consisting of two V shaped forks hinged together at their apexes. The outer ends of these forks are provided with any ordinary means for mounting the two wheels B B within the forks of the frame, so that the hinge or joint is midway between the peripheries of said two wheels. I prefer to employ solid, spokeless or imperforate wheels, as for instance disks of paper or wood instead of spokes, whereby there are no openings to endanger the rider or riders. Rising from the ends of the forks upon each side of the wheels are the supports C C for the dust guards D D whose outer ends are attached to the forks A A, near the hinge. Any suitable seat or saddle may be secured in position over the frame, as for instance by means of the standard E attached to the dust guard D. Spring recoil drums F F with their clutch mechanism are secured to the wheel hubs or axle, preferably as shown on the outside of the frame. To these drums I secure the propelling straps G G by one of their ends while their opposite ends I secure to the respective ends of the pedal bars H H, the latter hanging from the drums free to move up and down bodily while the straps are wound upon and unwound from said drums.

Spring recoil drums having clutch devices and straps are old and well known means for changing a reciprocating motion into a rotary one and therefore need not be specifically described.

The drums are so secured that downward pressure upon the pedal bars unwinds the straps and drives the drums and wheels in a direction to carry the vehicle forward and when the prssure is relieved the recoiling or retracting springs turn the drums in the reverse direction independently of the wheels, thereby winding up the straps and lifting the pedal bars for a repetition of the operation.

The steering frame L consists of two levers L' pivoted to the ends of the forward axle and joined near the other end by the transverse rod $L^2$ and braced by the rods $L^3$. I provide said frame with sliding handles, the handle rods $L^4$ bearing the handles being arranged to slide within perforations through the rod $L^2$ and the braces $L^3$ as best shown in Fig. 3, whereby the operator of the steering devices may swing or twist the frame to one side or the other, or he may push down upon one handle and pull up on the other and thereby turn the frame and wheel to give the desired direction to the machine. The sliding movement of the handles will enable the operator to more conveniently handle the steering frame than he could do if the handles were rigid with said frame. I furthermore make use of the sliding handles as pulls for assisting the rider in propelling the device when desired as for instance when going up a hill. The drums F F are provided with pulling straps M M which may be wound thereon in connection with the straps G G, one over the other if desired, as best shown on Sheet 2 of the drawings. One end of these pulling straps is attached to the handle rods $L^4$ whereby pulling on said handles will unwind the drums, the same as depressing the treadles, and both sets of straps may be operated simultaneously so that the rider can push with his feet and pull with his hands, the power all being transmitted to the drums, or either set of straps may be operated separately.

For example Fig. 6 represents the straps as wound on the drums the same as they will be when the pedal bars are nearly up and the handles nearly down. In order to more clearly show the different straps, I have represented the pulling straps M M from the handles, with hatch lines thereon and the propelling straps from the pedals, in solid black.

In Fig. 7 both straps are operated upon to drive the drum, and hence they are taut, the same being represented at the end of their stroke. In Fig. 8 they are also unwound and at the end of their stroke, but only the strap G is taut, as it alone was used to unwind the drum, hence the strap M is slack. Of course if the drum was driven by the strap M only the strap G would hang down under the weight of the pedal bar which would rise and fall as the drum was operated upon by said strap M.

Thus it will be seen that although both straps are secured to the same drum by one end and may be wound one over the other, while their opposite ends are connected with separate operating devices, they can be used together or separately as may be desired. It will also be observed that both wheels are made driving wheels and being connected by pedal bars all the weight of the rider can be transmitted to both the front and the rear wheels and in addition thereto all the pulling strength that he can exert in the opposite direction. It may also be observed that the pulls or sliding handles are mounted in the steering frame to slide in a path that is tangential to the drums.

It will be readily understood that wheels may be placed upon the outside instead of between the forks for a three or four wheeled machine, also that cords or chains are an equivalent for straps, and that by providing the drums with a gear wheel or pinion racks would be an equivalent for straps.

I claim as my invention—

1. The combination of the front and rear wheels with their spring recoil drums and straps, the frame for supporting said wheels hinged at a point between them, and the pedal bars connected with the straps from both wheels, substantially as described and for the purpose specified.

2. The combination of a hinged frame with wheels mounted thereon, with a steering frame having sliding handles, substantially as described and for the purpose specified.

3. In a vehicle, the combination of the spring recoil drums, two sets of straps, and two sets of operating devices, the outer end of one strap from a single drum being connected with one of said operating devices, while the outer end of the other strap from the same drum is connected with the other of said operating devices, substantially as described and for the purpose specified.

4. The combination of the wheels mounted on a suitable frame and provided with spring recoil driving drums and straps, pedal bars connected therewith for being depressed with the feet, and pulls also connected with said drums for being pulled by the hands in the reverse direction from that given the pedal bars, substantially as described and for the purpose specified.

5. The combination of a hinged frame with wheels mounted thereon, and provided with recoil drums, a steering frame having sliding handles and devices for connecting said sliding handles with said drums, substantially as described and for the purpose specified.

JOSEPH F. WHITAKER.

Witnesses:
CHARLES A. SAFFORD,
JOSEPH DAWSON.